United States Patent [19]

Brown

[11] 4,191,279

[45] Mar. 4, 1980

[54] SELF LUBRICATING ONE WAY COUPLING

[75] Inventor: Robert J. Brown, Ann Arbor, Mich.

[73] Assignee: Dana Corporation, Toledo, Ohio

[21] Appl. No.: 865,975

[22] Filed: Dec. 30, 1977

[51] Int. Cl.² .......................................... F16D 63/00
[52] U.S. Cl. .......................... 188/82.84; 188/264 D; 192/113 B; 308/187
[58] Field of Search ...................... 192/113 B, 113 R; 308/172, 168, 187; 188/264 R, 264 B, 264 D, 264 P, 264 CC, 82.84; 184/6.22

[56] References Cited

U.S. PATENT DOCUMENTS

| 2,698,773 | 1/1955 | Kaczor | 184/104 R |
| 3,175,667 | 3/1965 | Marland | 192/113 B |
| 3,181,674 | 5/1965 | Marland | 192/113 B |
| 3,198,305 | 8/1965 | Marland et al. | 192/113 B |
| 3,224,542 | 12/1965 | Zlotek | 308/127 |
| 3,399,000 | 8/1968 | Remmers | 308/172 |
| 3,497,273 | 2/1970 | Muijderman et al. | 308/172 |
| 4,068,748 | 1/1978 | Charchian et al. | 192/113 B |

Primary Examiner—Benjamin Wyche
Assistant Examiner—David C. Reichard
Attorney, Agent, or Firm—Wilson, Fraser, Barker & Clemens

[57] ABSTRACT

An overrunning clutch and hold-back coupling arrangement, preferably using a sprag-type clutch is disclosed. The coupling includes a lubrication arrangement providing for permanent oil lubrication and cooling from an external coolant supply and internal lubricant recirculation by an internal pump. Lubrication flow paths for distributing oil to all critical parts of the coupling and to control the flow of oil are provided.

7 Claims, 5 Drawing Figures

4,191,279

SELF LUBRICATING ONE WAY COUPLING

BACKGROUND OF THE INVENTION

There is a variety of available one-way coupling designs adapted to specific needs. In one-way coupling designs using sprag-type clutches for hold-back applications, one race is always stationary. The function of a hold-back clutch is to permit rotation of the non-stationery race in one direction only, and to prevent any rotation in the reverse direction at any time. Hold-back is the name given to the back-stop clutch when applied to an overrunning installation wherein the sole function of the clutch is that of militating against any retrograde movement of the rotating elements. Such couplings find use in a variety of applications and frequently must function reliably under extreme adverse conditions. One of the typical applications is in nuclear energy systems wherein the associated equipment and bearings are generally inaccessible.

Lubrication is, in the above application, an extremely difficult problem. Certain couplings may have an external pump for providing lubricant and such an arrangement may be highly satisfactory so long as the pump and related equipment are functioning satisfactorily. One shortcoming with previous coupling designs using an external lubricant supply is that it has limited ability to operate satisfactorily when such supply is terminated. Since loss of lubricant often occurs when the coupling is subjected to other difficult operating conditions, this is a serious shortcoming.

It is an object of the present invention to provide a hold-back coupling with an internal lubricant recirculation arrangement to provide satisfactory operation under extended adverse operating conditions.

It is a further object of the invention to provide such a coupling which is as simple and compact as possible to provide a relatively low cost solution to the foregoing problems.

SUMMARY OF THE INVENTION

The above, and other objects of the present invention, may be achieved by a self lubricating coupling including a generally cylindrical uni-directional driving means; a first member fixed against rotation and including a generally cylindrical portion defined on the exterior thereof in driving engagement with the radially inner portion of the uni-directional driving means; a second member adapted for connection to a rotating machine and including a generally cylindrical portion defined on an interior wall portion thereof in driving engagement with the radially outer portion of the uni-directional driving means; an annular fluid lubricant sump carried by the second member beneath the driving means; and, fluid circulating means carried by the first member and disposed to depend into the annular sump whereby upon relative rotational movement of the second member and the sump with respect to the first member and the fluid circulating means, fluid is circulated.

BRIEF DESCRIPTION OF THE DRAWINGS

The above objects, features, and advantages of the invention will become manifest to those skilled in the art from reading the following detailed description of the preferred embodiment of the invention when considered in the light of the accompanying drawings, in which.

DESCRIPTION OF THE PREFERRED EMBODIMENT

Figure 1:
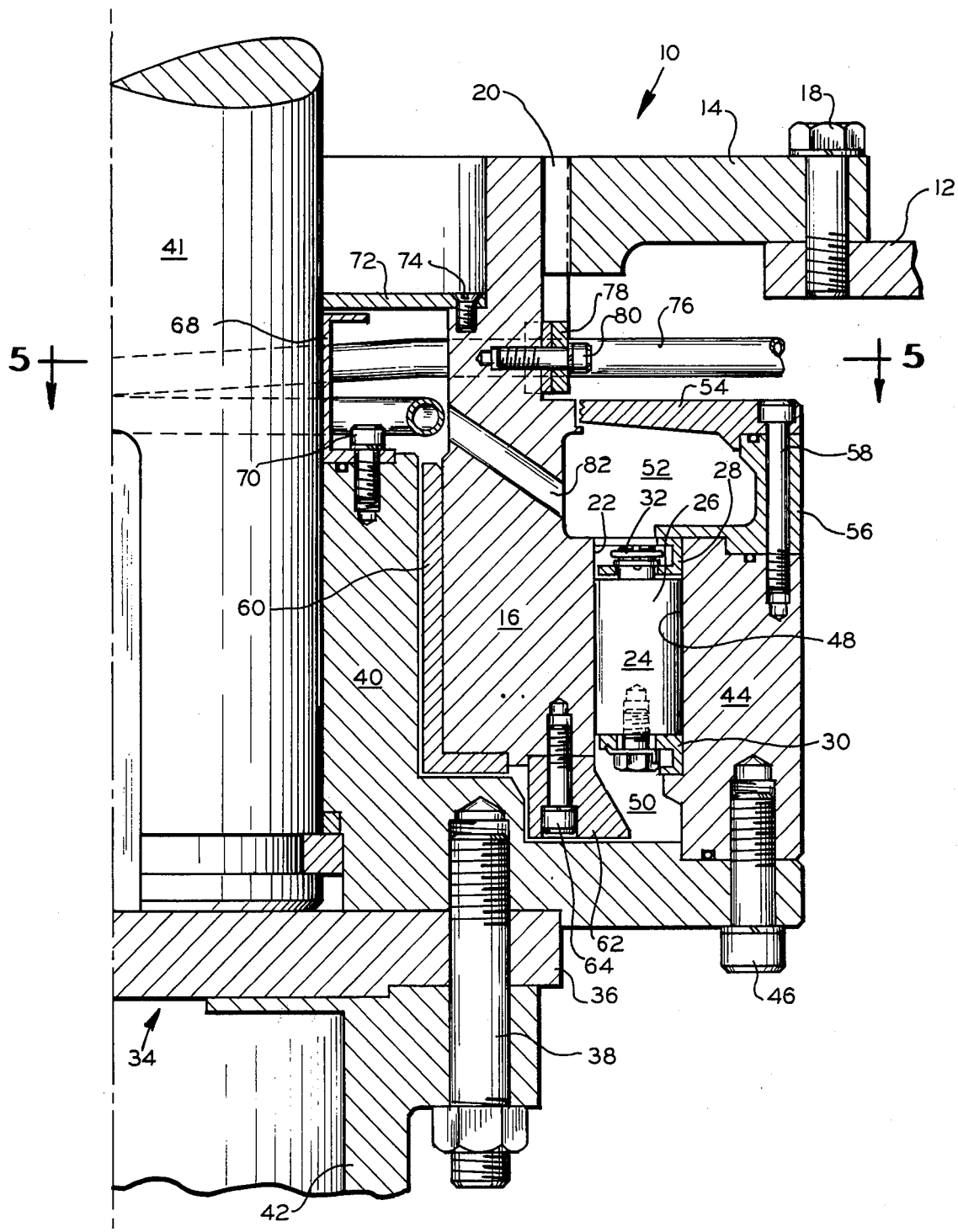
FIG. 1 is a fragmentary sectional view of a driving system employing the novel features of the present invention.

FIG. 1 of the drawing illustrates a preferred embodiment of the invention for use in an overrunning clutch and hold-back coupling arrangement. The coupling consists of a first member fixed against rotation and generally indicated by reference numeral 10. The member 10 includes a generally outwardly extending torque arm 12 and an associated torque ring 14. A generally cylindrical member 16 depends from the torque ring 14. The torque ring 14 is secured to the torque arm 12 by means of threaded fasteners 18, for example. The upper portion of the cylindrical member 16 is provided with a series of radially outwardly extending splines which cooperate with a series of radially inwardly extending splines on the inner portion of the torque ring 14 to provide a splined connection 20 between the member 16 and the torque ring 14 and its associated torque arm 12. The splined connection 20 provides an efficient means for mounting the assembly and provides a means for transmitting hold-back torque as will become apparent hereinafter. The cylindrical member 16 has a radially outer face 22 adapted for hold-back engagement with a uni-directional driving means 24 which preferably takes the form of a plurality of sprag elements 26 mounted between a pair of spaced apart retainer members 28 and 30, and resiliently located via energizing springs 32. Such arrangements are well known in the prior art, as shown in U.S. Pat. No. 2,954,855, the disclosure of which is incorporated herein by reference. For the particular application illustrated, it is preferred that the sprag geometry be such as to cause the sprags to disengage the surface 22, when the sprags 26 and retainers 28 and 30 are rotating, under the action of centrifugal force. This arrangement known as centrifugal throwout is also well known in the art.

It will be understood that the torque arm 12 is provided of suitable length and strength to react as required to hold the member 16 against rotation.

The coupling also includes a rotatable member generally designated by reference numeral 34 with a disc-like base member 36 with holes provided for receiving threaded fasteners 38 which extend therethrough into tapped internally threaded holes in an adapter element 40 to thereby secure the coupling to the rotating driven device 42. The adapter element 40 is typically press fitted or keyed to the outer cylindrical surface of the armature shaft 41 of an electric motor, not shown, which is employed to impart rotary movement to the rotating elements of the system.

A cylindrical member 44 is affixed to the element 40 by any suitable means such as threaded fasteners 46. The interior surface 48 of the cylindrical member 44 is adjacent to the annular array of clutch sprags 26 and, through it, in one-way driving relation with the radially outer surface 22 of the stationary member 16. An oil sump 50 is provided below and generally radially aligned with the clutch 24 preferably in the form of an annular cavity defined by cooperating inner surfaces of the adapter element 40 and the cylindrical member 44. A cooperating annular oil cavity 52 is provided above and generally radially aligned with the clutch 24. The cavity 52 is defined by the cooperating inner surfaces of an annular cover plate 54 and a flanged ring 56, both of which are secured to the cylindrical member 44 by suitable threaded fasteners 58.

It will be observed that the retainer members 28 and 30 of the clutch 24 are secured in place between the cooperating inner annular marginal edge of the flanged ring 56 and an annular shoulder 60 formed on the inner wall of the cylindrical member 44.

It will be observed that the radially outer surface of the spacer element 40 and the inner surface of the cylindrical member 44 from an overall rotational member which is generally U-shaped and surrounds the stationary cylindrical member 16 and the clutch 24 on three sides and serves to retain lubricant within the clutch. A bearing 60 is suitably affixed to the inner surface of the stationary cylindrical member 16 to facilitate relative rotation between the cylindrical member 16 and the relatively rotating spacer element 40. The bottom of the bearing 60 is generally at a right angle to the main body portion thereof, and serves as a thrust bearing portion for the rotating spacer element 40 and axially locates the bearing 60 relative to the bearing surface of the cylindrical spacer element 40. The bearing 60 is typically shrink-fitted to positively locate it on the cylindrical member 16.

Figure 2:
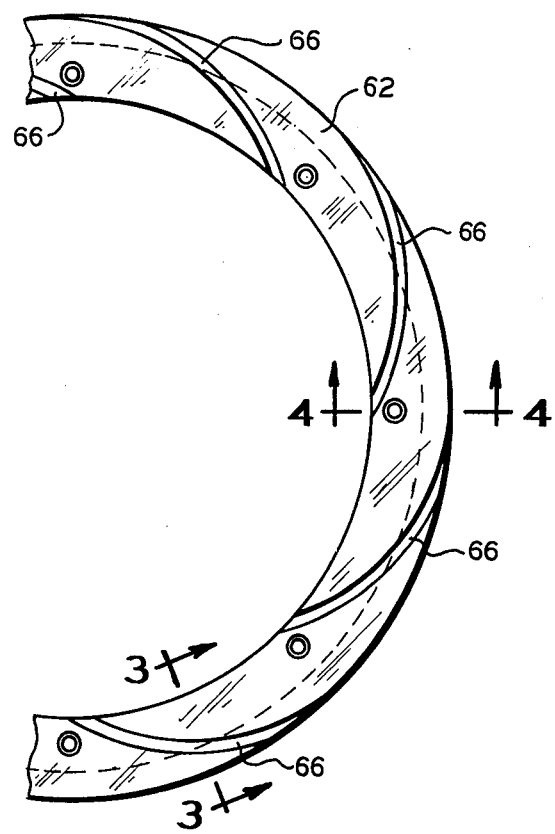
FIG. 2 is a fragmentary view of the bottom surface of the annular fluid circulating means of the system illustrated in FIG. 1 which cooperates in the distribution of lubricant to the bearing surfaces thereof.
Figure 3:
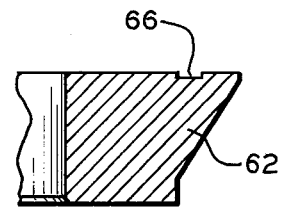
FIG. 3 is a sectional view of the annular fluid circulating means illustrated in FIG. 2 taken along line 3—3 thereof.
Figure 4:
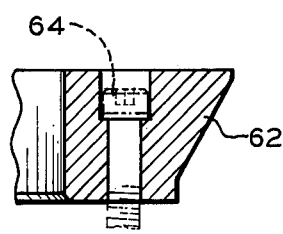
FIG. 4 is another sectional view of the annular fluid circulating means illustrated in FIG. 2 taken along line 4—4 thereof.
Figure 5:
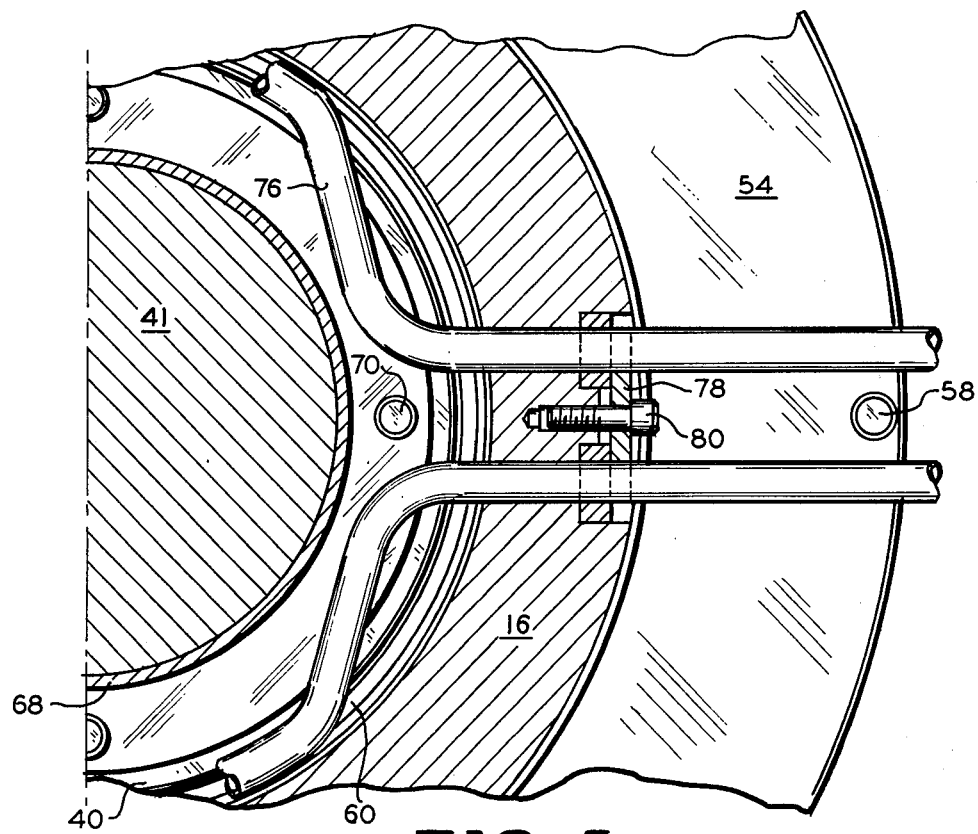
FIG. 5 is a fragmentary sectional view of the driving system illustrated in FIG. 1 taken along line 5—5 thereof.

An annular ring 62 is secured to depend from the bottom surface of the stationary cylindrical member 16 by means of threaded fasteners 64, for example. The annular ring 62 is positioned to depend into the sump 50 and contains a plurality of spiral fluid conducting grooves or passageways 66 as are clearly illustrated in FIGS. 2 and 3. It will be observed from an examination of FIG. 4 that the fasteners 64 are tightened so that the headed portions thereof are recessed within the body portion of the lower surface of the annular ring 62 and may be of the type to receive an Allen-type fastening tool or any other suitable type tool.

An annular slinger member 68 is secured to the upper portion of the cylindrical spacer element 40 by means of threaded fasteners 70, for example. The slinger element 68 is generally U-shaped in cross-section, and is adapted to be maintained within the zone defined by the inner surfaces of a portion of the stationary cylindrical member 16, the upper portion of the cylindrical spacer element 40, and a retainer ring 72 which is secured to the cylindrical member 16 by means of threaded fasteners 74, for example.

In order to remove heat energy from the lubricating fluid employed to lubricate the bearing surfaces of the bearing 60 and the associated walls of the cylindrical spacer element 40, there is provided a cooling coil 76 which tends to surround the electric motor armature shaft 41 of the region of the slinger member 68. The cooling coil 76 may be maintained in a fixed position by a retaining device, generally indicated by reference numeral 78, which, in turn, is secured to the stationary cylindrical members 16 by a threaded fastener 80, for example.

Suitable passageways 82 are formed in the body of the cylindrical member 16 to provide communication between the lubricating fluid cooling zone containing the cooling coil 76 in the region in which it encircles the slinger member 68 and the armature shaft 41 and the cavity 52.

Since the device thus far illustrated is to be utilized in a closed environment, such as in a nuclear reactor system, for example, the system must contain a permanent lubricating fluid which must be continuously circulated during the operating cycles of the system. In this regard, it will be appreciated that a continuous film of lubricating fluid such as oil, for example, must be maintained between the facing surfaces of the cylindrical spacer element 40 and the bearing 60. In order to achieve the desired objective, it will be noted that the electric motor armature shaft 41 will be caused to rotate, and in certain applications as high as 1800 RPM, which will simultaneously cause the spacer element 40 and the cylindrical member 44 to rotate causing the sprag elements 26 of the clutch 24 to be thrust outwardly away from the outer surface 22 of the stationary cylindrical member 16 by centrifugal force. The lubricating oil maintained within a system is caused to be continuously moved by the frictional engagement of the inner rotating wall surfaces and by gravity to the region of the sump 50. The oil within the sump 50 is caused to travel inwardly through the grooves or passageways 66 and upwardly between the opposing faces of the spacer element 40 and the bearing 60 to continuously and constantly maintain a lubricating film therebetween. The pumping action caused by the relative movement of the cylindrical member 40 and the lower surface of the annular ring 62 in addition to the static head caused by the residual oil that is present in the cavity 52, the clutch assembly 24, and the sump 50, is sufficient to cause a pressure drop between the sump 50 and the zone defined by the outer surface of the slinger member 68. In accordance with the above procedure, constant lubrication is maintained between the stationary and rotating elements of the system.

Also, it will be understood that the heat energy developed within the system is constantly removed by circulating a suitable coolant fluid through the cooling coil 76.

While mention has been made in the aforementioned description that the lubricant is contained solely within the coupling, it will be understood that an auxiliary exterior source of lubricant could be employed to constantly replenish the supply of lubricant to the coupling. In such an arrangement, the best energy contained within the lubricant, after passage through the lubricated bearing surfaces, can be removed externally of the coupling thereby eliminating the need for the cooling coils 76.

In accordance with the provisions of the patent statutes, I have explained the principle and mode of operation of my invention and have illustrated and described what I now consider to represent its best embodiment. However, it must be understood that within the scope of the appended claims, the invention may be practiced otherwise than as specifically illustrated and described.

I claim:

1. A self lubricating coupling comprising:
   a generally cylindrical uni-directional driving means;
   a first member fixed against rotation and including a generally cylindrical portion defined on the exterior thereof drivingly engagable with the radially inner portion of said uni-directional driving means;
   a second member adapted for connection to a rotating machine and including a generally cylindrical portion defined on an interior wall portion thereof drivingly engagable with the radially outer portion of said uni-directional driving means;
   an annular fluid lubricant sump defined by an interior wall portion of said second member; and
   fluid circulating means carried by said first member and disposed in said sump, said fluid circulating means including a plurality of generally radially extending spirally formed fluid passageways in facing spaced relation to an interior wall portion of said second member, whereby upon relative motion of said second member with respect to said first member fluid is circulated.

2. The invention defined in claim 1 wherein said uni-directional driving means includes a plurality of sprag elements in an annular array.

3. The invention defined in claim 1 including a reservoir of fluid lubricant maintained within said sump.

4. The invention defined in claim 1 wherein said passageways are disposed below said uni-directional driving means.

5. The invention defined in claim 1 wherein said passageways lie in a plane generally at right angle to the axis of rotation of said second member.

6. The invention defined in claim 3 including an annular bearing between the interior portion of said first member and an adjacent portion of said second member.

7. The invention defined in claim 3 including means for extracting heat energy from the lubricant.

* * * * *